(12) United States Patent
Gruhler et al.

(10) Patent No.: US 11,873,899 B2
(45) Date of Patent: Jan. 16, 2024

(54) SEAL ARRANGEMENT, BATTERY OR CONTROL BOX, MOTOR VEHICLE AND METHOD FOR PRODUCING A SEAL ARRANGEMENT

(71) Applicant: ElringKlinger AG, Dettingen (DE)

(72) Inventors: Tobias Michael Gruhler, Pfullingen (DE); Stefan Dwenger, Reutlingen (DE); Robert Linkor, Eningen u.A. (DE)

(73) Assignee: ElringKlinger AG, Dettingen (DE)

( * ) Notice: Subject to any disclaimer, the term of this patent is extended or adjusted under 35 U.S.C. 154(b) by 61 days.

(21) Appl. No.: 17/016,214

(22) Filed: Sep. 9, 2020

(65) Prior Publication Data

US 2020/0408303 A1    Dec. 31, 2020

Related U.S. Application Data

(63) Continuation of application No. PCT/EP2019/056553, filed on Mar. 15, 2019.

(30) Foreign Application Priority Data

Mar. 16, 2018 (DE) ..................... 10 2018 204 085.0

(51) Int. Cl.
*F16J 15/06* (2006.01)
*F16J 15/08* (2006.01)

(52) U.S. Cl.
CPC ......... *F16J 15/067* (2013.01); *F16J 15/0818* (2013.01)

(58) Field of Classification Search
CPC ......... F16J 15/067; F16J 15/0818; F16J 15/06
See application file for complete search history.

(56) References Cited

U.S. PATENT DOCUMENTS

| 1,986,465 A | 1/1935 | Dempsey |
| 3,175,832 A | 3/1965 | Carrell |
| 3,231,289 A | 1/1966 | Carrell |

(Continued)

FOREIGN PATENT DOCUMENTS

| DE | 200 19 818 U1 | 3/2001 |
| DE | 10 2005 013 813 A1 | 9/2006 |

(Continued)

*Primary Examiner* — Eugene G Byrd
(74) *Attorney, Agent, or Firm* — ASLAN LAW, P.C.

(57) ABSTRACT

In order to provide a seal arrangement, in particular for sealing a first fluid space from a second fluid space or a plurality of fluid spaces, which on the one hand is producible in a simple and cost-effective manner and also enables a reliable sealing of a first fluid space from a second fluid space, it is proposed that the seal arrangement comprises the following: A sealing element for arranging between a first object and a second object, wherein the sealing element comprises two or more mutually connectible or mutually connected sealing element components, which each comprise a base body part and an elastic sealing body part arranged on the base body part, wherein the base body parts of the sealing element components form a preferably dimensionally stable base body of the sealing element, wherein the elastic sealing body parts of the sealing element components form an elastic sealing body for providing a sealing function of the sealing element.

15 Claims, 6 Drawing Sheets

(56) References Cited

U.S. PATENT DOCUMENTS

| | | | |
|---|---|---|---|
| 3,259,404 A * | 7/1966 | Papenguth | F16J 15/104 |
| | | | 285/212 |
| 3,738,670 A | 6/1973 | Jelinek et al. | |
| 5,149,109 A | 9/1992 | Jelinek et al. | |
| 5,236,203 A | 8/1993 | Uchida et al. | |
| 5,482,400 A | 1/1996 | Bavington | |
| 5,618,047 A | 4/1997 | Belter | |
| 5,634,645 A * | 6/1997 | Seki | F16J 15/104 |
| | | | 277/654 |
| 5,906,377 A | 5/1999 | Salameh | |
| 5,975,539 A * | 11/1999 | Ueda | F16J 15/123 |
| | | | 277/593 |
| 6,761,360 B2 * | 7/2004 | Hammi | B64D 37/005 |
| | | | 277/630 |
| 9,759,327 B2 * | 9/2017 | Olivas | F16J 15/022 |
| 2004/0172824 A1 * | 9/2004 | Schenk | F16J 15/067 |
| | | | 29/888.3 |
| 2008/0093808 A1 * | 4/2008 | Quick | B23K 26/355 |
| | | | 277/592 |
| 2014/0319782 A1 * | 10/2014 | Mohammad | F16J 15/14 |
| | | | 277/637 |
| 2017/0051830 A1 | 2/2017 | Olivas et al. | |
| 2020/0340584 A1 * | 10/2020 | Pham | F16J 15/122 |
| 2020/0386313 A1 * | 12/2020 | Hwang | F16J 15/0818 |
| 2020/0408303 A1 | 12/2020 | Gruhler et al. | |

FOREIGN PATENT DOCUMENTS

| | | | | |
|---|---|---|---|---|
| DE | 20 2007 009 319 U1 | 10/2007 | | |
| DE | 10 2018 204 085 A1 | 9/2019 | | |
| DE | 20 2018 105 005 U1 | 9/2019 | | |
| FR | 2 659 122 A1 | 9/1991 | | |
| JP | 60049166 A * | 8/1983 | | F16J 15/067 |
| JP | 60-049166 | 3/1985 | | |
| WO | WO 2019/175391 A1 | 9/2019 | | |

* cited by examiner

SEAL ARRANGEMENT, BATTERY OR CONTROL BOX, MOTOR VEHICLE AND METHOD FOR PRODUCING A SEAL ARRANGEMENT

RELATED APPLICATION

This application is a continuation of international application No. PCT/EP2019/056553 filed on Mar. 15, 2019, and claims the benefit of German application No. 10 2018 204 085.0 filed on Mar. 16, 2018, which are incorporated herein by reference in their entirety and for all purposes.

FIELD OF DISCLOSURE

The present invention relates to a seal arrangement, in particular a seal arrangement for sealing a first fluid space from a second fluid space or a plurality of fluid spaces. The seal arrangement comprises a sealing element for arranging between a first object and a second object.

BACKGROUND

So-called carrier gaskets or metal elastomer gaskets which are used for providing a seal between two components or objects are known from the prior art.

Said carrier or metal elastomer gaskets known from the prior art typically have an in particular metallic base body and an elastic sealing body arranged on the base body. By means of carrier or metal elastomer gaskets of that kind, two objects can be simply sealingly connected to each other in the region of a planar connecting surface, wherein an introduction of a groove into the components for fixing a sealing element can preferably be avoided. Tolerance problems in the introduction of the groove therefore do not arise. In contrast to a liquid seal, which are often chosen when components that have a planar connecting surface are to be connected, carrier or metal elastomer gaskets are also comparatively easily demountable.

In addition, objects to be connected to each other, in particular metallic objects to be connected to each other, can be through-contacted by the metallic base body of a carrier or metal elastomer gasket. An increased electromagnetic compatibility (EMC) can thus be provided by means of the carrier or metal elastomer gasket. Carrier or metal elastomer gaskets thus enjoy increasing popularity.

The sealing bodies of the carrier or metal elastomer gaskets are typically injection molded onto an in particular annular, preferably metallic, base body in an injection molding process. The size of an injection molding tool to be used, in particular the size of a required injection molding machine, is thereby determined, among other things, by the size or dimension of the base body.

Until now, it is therefore not possible e.g. to produce carrier or metal elastomer gaskets for battery boxes of electric vehicles, because they are not producible in known injection molding tools and/or injection molding machines due to their size and/or dimension.

SUMMARY OF THE INVENTION

The object underlying the present invention is therefore to provide a seal arrangement which on the one hand can be produced in a simple and cost-effective manner and also enables a reliable sealing of a first fluid space from a second fluid space.

This object is achieved by a seal arrangement with the features of claim 1.

The sealing element of the seal arrangement comprises in particular two or more mutually connectible or mutually connected sealing element components which each comprise a base body part and an elastic sealing body part arranged on the base body part.

The base body parts of the sealing element components form in particular a preferably dimensionally stable base body of the sealing element.

In particular, the base body parts of the sealing element components form a base body for providing a load-bearing function of the sealing element.

Within the scope of this description and the accompanying claims, a load-bearing function is understood in particular as a transmission of compressive forces, in particular between two objects or components.

The elastic sealing body parts of the sealing element components preferably form an elastic sealing body for providing a sealing function of the sealing element.

The base body of the sealing element is preferably of annular, in particular annularly closed, configuration when the sealing element components are connected to each other.

Within the scope of this description and the accompanying claims, an annular shape is understood in particular as a closed shape of the sealing element. The annular shape of the sealing element may thereby in particular be a circular ring shape or a shape different from a circular ring shape.

Because the sealing element components are connectible to each other, the base body parts forming a base body and the sealing body part forming a sealing body, it can preferably be achieved that the elastic sealing body parts can each be injection molded onto a respective base body part in an injection molding process due to the smaller size or dimension of the individual sealing element components. The individual sealing element components can then be connected to form a sealing element. It can therefore be made possible in particular for the elastic sealing body parts to be producible in a comparatively small injection molding tool and/or a comparatively small injection molding machine.

The base body and/or the base body parts are preferably made of an at least approximately inflexible or stiff material.

The sealing element and/or the base body of the sealing element are preferably of flat configuration.

The sealing element and/or the base body extend in particular at least approximately along a plane, in particular along a main plane of extent, of the sealing element.

The elastic sealing body and/or the elastic sealing body parts are preferably produced by means of injection molding.

In particular the elastic sealing body and/or the elastic sealing body parts are injection molded onto the base body and/or onto the base body parts. Within the scope of this description and the accompanying claims, injection molding is understood in particular as a connection of the base body parts to the sealing body parts, wherein the elastic sealing body parts are produced in an injection molding process in such a way that they are fixed to the base body and/or to the base body parts.

The elastic sealing body and/or the elastic sealing body parts are in particular injection molded parts.

The sealing element is preferably a carrier gasket and/or a metal elastomer gasket.

The elastic sealing body preferably comprises one or more sealing lips.

In one embodiment of the invention, provision is made for the sealing element components to be connectible to each other in a puzzle-like manner, in particular in a positive-locking manner, in particular for producing one or more annularly closed shapes of the base body.

The sealing element components are in particular releasably connectible.

The sealing element components are preferably connectible to each other, in particular at an abutment region of the base body parts, by indirect or direct connection of the base body parts.

Within the scope of this description and the accompanying claims, an indirect connection of the base body parts is understood in particular as a connection of the base body parts by means of elastic sealing body parts arranged on the base body parts.

Within the scope of this description and the accompanying claims, a direction connection is understood in particular as a connection of the base body parts directly to each other, i.e. in particular no elastic sealing body part is necessary for the connection of the base body parts.

In one embodiment of the invention, provision is made for the sealing element to comprise a plurality of identical sealing element components and/or a plurality of identical base body parts and/or a plurality of identical elastic sealing body parts.

It is hereby conceivable in particular for two or more, in particular all, sealing element components to be of completely identical configuration. In particular, both the base body parts and the elastic sealing body parts can then also be of completely identical configuration.

Alternatively, it is possible in particular for two or more, in particular all, base body parts to be of identical configuration, but for the elastic sealing body parts to be configured differently from each other.

Alternatively, it is possible for the base body parts to be configured differently, but for two or more, in particular all, elastic sealing body parts to be of identical configuration.

Ideally, the number of different components required for the seal arrangement can thus be reduced overall, the seal arrangement being producible more cost-effectively overall. A seal arrangement with a sealing element producible according to a modular principle can preferably be provided, such that sealing elements in different geometries can be achieved by means of a modular system.

In one embodiment of the invention, provision is made for the base body parts to each comprise one or more, in particular in each case two, connecting portions for connecting the base body parts to each other.

The connecting portions are preferably formed in one piece with the base body parts.

The base body parts are connectible to each other, preferably in a positive-locking manner, by means of the connecting portions.

In particular, the base body parts are connectible to each other in a puzzle-like manner by means of the connecting portions.

The connecting portions are preferably configured complimentarily to each other in such a way that they interengage each other in a positive-locking manner when the base body parts are connected to each other.

In one embodiment of the invention, provision is made for the base body parts to be connectible to each other, in particular connectible by plugging, in a direction perpendicular to a main plane of extent of the sealing element.

The base body parts are preferably connectible to each other in an assembly direction which in particular runs perpendicular to the main plane of extent of the sealing element.

The connecting portions in particular each have one or more, in particular in each case two, undercut portions.

The undercut portions are preferably configured in such a way that mutually connected base body parts are coupled, in particular are connected in a positive-locking manner, in the region of the connecting portions in a direction parallel to the main plane of extent of the sealing element.

Preferably, mutually connected base body parts are, in particular, anchored in a positive-locking manner in the region of the connecting portions in a direction parallel to the main plane of extent of the sealing element.

The connecting portions preferably each comprise a connecting portion geometry, wherein two connecting portions are each configured complementarily to each other in such a way that each connecting portion comprises a positive form of the connecting portion geometry, wherein each connecting portion comprises a negative form of the connecting portion geometry.

The positive form and the negative form of the connecting portion geometry are preferably configured complementarily to each other.

The positive form and/or the negative form of the connecting portion geometry is in particular a dovetail geometry.

It may be favorable if the connecting portions and/or the connecting portion geometry are configured symmetrical to a symmetry plane.

In particular in each case only two connecting portions of a seal arrangement correspond to each other.

Preferably, in each case only two connecting portions are configured complementarily to each other, i.e. they have a mutually complementary connecting portion geometry with a positive form and a negative form complementary thereto. In particular different connecting portion geometries are provided. It can thus be avoided that the base body parts and/or the sealing element components are connected to each other incorrectly.

A sealing element can thus preferably be provided which is simple to produce, in particular is simple to assemble.

In one embodiment of the invention, provision is made for the elastic sealing body parts to each comprise a coupling portion for coupling mutually abutting or mutually overlapping elastic sealing body parts.

The coupling portions are in particular configured in such a way that the elastic sealing body parts sealingly abut each other in the region of the coupling portions when the sealing element components and/or the base body parts are connected to each other, in particular when the sealing element is sealingly arranged between a first object and a second object.

The coupling portions preferably each have a coupling geometry.

In particular, the coupling portions of each two elastic sealing body parts have a mutually complementary coupling geometry.

The coupling geometry of the coupling portions has in particular no undercuts in the assembly direction of the seal components and/or the base body parts, i.e. in a direction perpendicular to a main plane of extent of the sealing element. The elastic sealing body parts are thus preferably configured to sealingly abut each other upon assembly or connection of the base body parts in a direction perpendicular or oblique, i.e. transverse, to the main plane of extent.

The base body parts are preferably connectible to elastic sealing body parts arranged thereon by means of the connecting portions in a direction perpendicular to the main plane of extent without a connection of the base body parts being hindered by undercuts in the coupling geometry.

The coupling geometry is e.g. a chamfer or an inclined face, i.e. a face arranged obliquely to the main plane of extent.

Alternatively or in addition thereto, it is conceivable for the coupling geometry to be stepped or corrugated.

In one embodiment of the invention, provision is made for the elastic sealing body to be arranged on an edge of the base body.

The elastic sealing body is preferably arranged on an inner edge surrounded by the base body and/or on an outer edge surrounding the base body.

With a base body of the sealing element that is annularly closed in the assembled state of the seal arrangement, the elastic sealing body is preferably arranged on an inner edge of the base body, in particular on a circumferential inner edge of the base body, but in particular is interrupted in the region of the base body parts and/or the elastic sealing body parts.

It is in particular conceivable for the elastic sealing body to also be arranged on an outer edge of the base body surrounding the base body of the sealing element.

The elastic sealing body parts are preferably arranged on an edge of the base body parts, in particular by means of injection molding (so-called edge-molding).

In one embodiment of the invention, provision is made for the elastic sealing body parts to each extend along an edge of a base body part, in particular along an edge of an abutment region of the base body parts.

The elastic sealing body parts preferably also extend in particular along an edge of the connecting portions of the base body parts. In particular, the elastic sealing body parts thereby extend in the region of a connecting portion of the connecting portion geometry.

The elastic sealing body parts are preferably arranged on a positive form and/or on a negative form of the connecting portion geometry of the connecting portions.

In particular, arranged both on the positive form and on the negative form of the connecting portion geometry of the connecting portions is a respective elastic sealing body part.

Alternatively, it is conceivable for an elastic sealing body part to be arranged only on the positive form or only on the negative form of the connecting portion geometry of the connecting portions.

The elastic sealing body parts are arranged in particular at an abutment region of the base body parts and preferably form there an abutting joint.

Within the scope of this description and the accompanying claims, an abutment region of the base body parts is understood in particular as a joint region of the base body parts.

It is thus conceivable for an elastic sealing body part to be arranged on only one base body part in the abutment region of the base body parts.

Alternatively, it is conceivable for a respective elastic sealing body part to be arranged on both base body parts in the abutment region of the base body parts, wherein the two elastic sealing body parts have a mutually complementary coupling geometry.

An elastic sealing body part is preferably associated with each base body part. The number of sealing body parts thus corresponds in particular to the number of base body parts.

In one embodiment of the invention, provision is made for the elastic sealing body to have a sealing body height in a direction perpendicular to a main plane of extent of the sealing element, wherein the base body has a base body height in a direction perpendicular to the main plane of extent of the sealing element, wherein the sealing body height is greater than the base body height.

The sealing body height and/or the base body height are in particular uniform, i.e. the sealing body and/or the base body preferably have a uniform height in the height direction.

In particular, an average sealing body height is greater than an average base body height.

It can thus preferably be achieved that the elastic sealing body is compressed at least in regions when a sealing element is arranged between two objects.

The base body preferably has a base body height in the range of 1 to 3 mm, in particular in the range of 1.5 to 2 mm.

The sealing body height is in particular about 15 to 40%, in particular about 25%, greater than the base body height.

The elastic sealing body preferably has in the region of an inner edge of the base body a sealing body height which is greater than a sealing body height of the elastic sealing body in the region of the connecting portions.

In one embodiment of the invention, provision is made for the elastic sealing body to comprise an elastomer material or to be made of an elastomer material, wherein the elastomer material preferably is an ethylene acrylate rubber (AEM), an ethylene propylene diene rubber (EPDM), an acrylate rubber (ACM), a fluororubber (FKM), a hydrogenated acrylonitrile butadiene rubber (HNBR), or a silicone rubber (MVQ), in particular a vinyl methyl polysiloxane, and/or for the base body to be made of a metallic base body material or to comprise a metallic base body material, wherein the metallic base body material in particular is steel or aluminum.

It may be favorable if the elastomer material comprises a mixture of one or more of the aforementioned rubber materials.

Alternatively or in addition thereto, it is also conceivable for the base body to be produced of a plastics material or comprise a plastics material. The plastics material of the base body hereby preferably comprises polyphenylene sulfide (PPS), in particular fiber-reinforced polyphenylene sulfide (PPS).

In one embodiment of the invention, provision is made for the base body and/or the base body parts to be produced by means of punching and/or by means of laser cutting and/or by means of water jet cutting and/or by means of manual cutting.

Alternatively or in addition hereto, it is in particular also conceivable for the base body and/or the base body parts to be produced by means of injection molding, in particular if the base body is made of a plastics material.

The base body and/or the base body parts are preferably produced completely by means of punching and/or laser cutting from a sheet metal material.

In particular, no further method steps are thereby performed for producing the base body and/or the base body parts.

The connecting portions of the base body parts are thus preferably also produced by punching and/or laser cutting.

The invention further relates to a battery or control box.

Within the scope of this description and the accompanying claims, a battery box is understood in particular as a housing for one or more batteries, in particular batteries of an electric motor vehicle.

Within the scope of this description and the accompanying claims, a control box is understood in particular as a housing for one or more control components and/or one or more control devices.

A further object underlying the invention is therefore to provide a battery or control box in which a sealing element is simply and securely mounted and thus a first fluid space can be reliably sealed from a second fluid space.

This object is achieved by a battery or control box with the features of claim 12.

The battery or control box comprises a seal arrangement in accordance with any one of claims 1 to 11.

The sealing element is thereby in particular sealingly arranged between a box base part and a box lid.

The invention further relates to a motor vehicle.

A further object underlying the invention is therefore to provide a motor vehicle in which a sealing element is simply and securely mounted and thus a first fluid space can be reliably sealed from a second fluid space.

This object is achieved by a motor vehicle with the features of claim 13.

The motor vehicle comprises one or more seal arrangements in accordance with any one of claims 1 to 11, in particular a battery or control box in accordance with claim 12.

The invention further relates to a method for producing a seal arrangement for sealing a first fluid space from a second fluid space or a plurality of fluid spaces.

The object underlying the invention is therefore to provide a method for producing a seal arrangement with which a seal arranged means can be produced in a simple and cost-effective manner, which enables a reliable sealing of a first fluid space from a second fluid space.

This object is achieved by a method with the features of claim 14.

The method in particular comprises the following: providing a plurality of sealing element components which each comprise a base body part and an elastic sealing body part arranged on the base body part; connecting the sealing element components to each other in a puzzle-like and/or form-locking manner.

It may be favorable if the connected sealing element components form a preferably closed, in particular annularly closed, sealing element.

In particular, the method steps are performed in the specified order.

Preferably every single sealing element component provided is smaller and/or shorter than the sealing element which, in the connected state of the sealing element components, is formed by the sealing element components.

It may be favorable if one or more, in particular all, sealing element components provided each have, taken on their own, smaller dimensions in a main plane of extent than the finished sealing element when the latter is formed by the sealing element components in the connected state of the sealing element components.

It may be favorable if the dimensions of one or more, in particular all, sealing element components provided are each smaller in one, two, or all three spatial directions than the dimensions of the sealing element as a whole when the latter is formed by the sealing element components in the connected state of the sealing element components.

In one embodiment of the method, provision is made for the sealing element components to be produced as mutually separate components, wherein in each case an elastic sealing body part is injection molded onto a respective base body part in an injection molding process.

In the production of the base body parts, connecting portions for connecting the base body parts in a positive-locking manner are preferably produced.

The base body and/or the base body parts are produced in particular by means of punching and/or by means of laser cutting, in particular from a sheet metal material.

The elastic sealing body parts are preferably injection molded onto an edge of the base body parts.

Further preferred features and/or advantages of the invention are the subject matter of the subsequent description and the illustrative depiction of embodiments.

BRIEF DESCRIPTION OF THE DRAWINGS

The same or functionally equivalent elements are provided with the same reference numerals in all Figures.

DETAILED DESCRIPTION OF THE DRAWINGS

Figure 1:
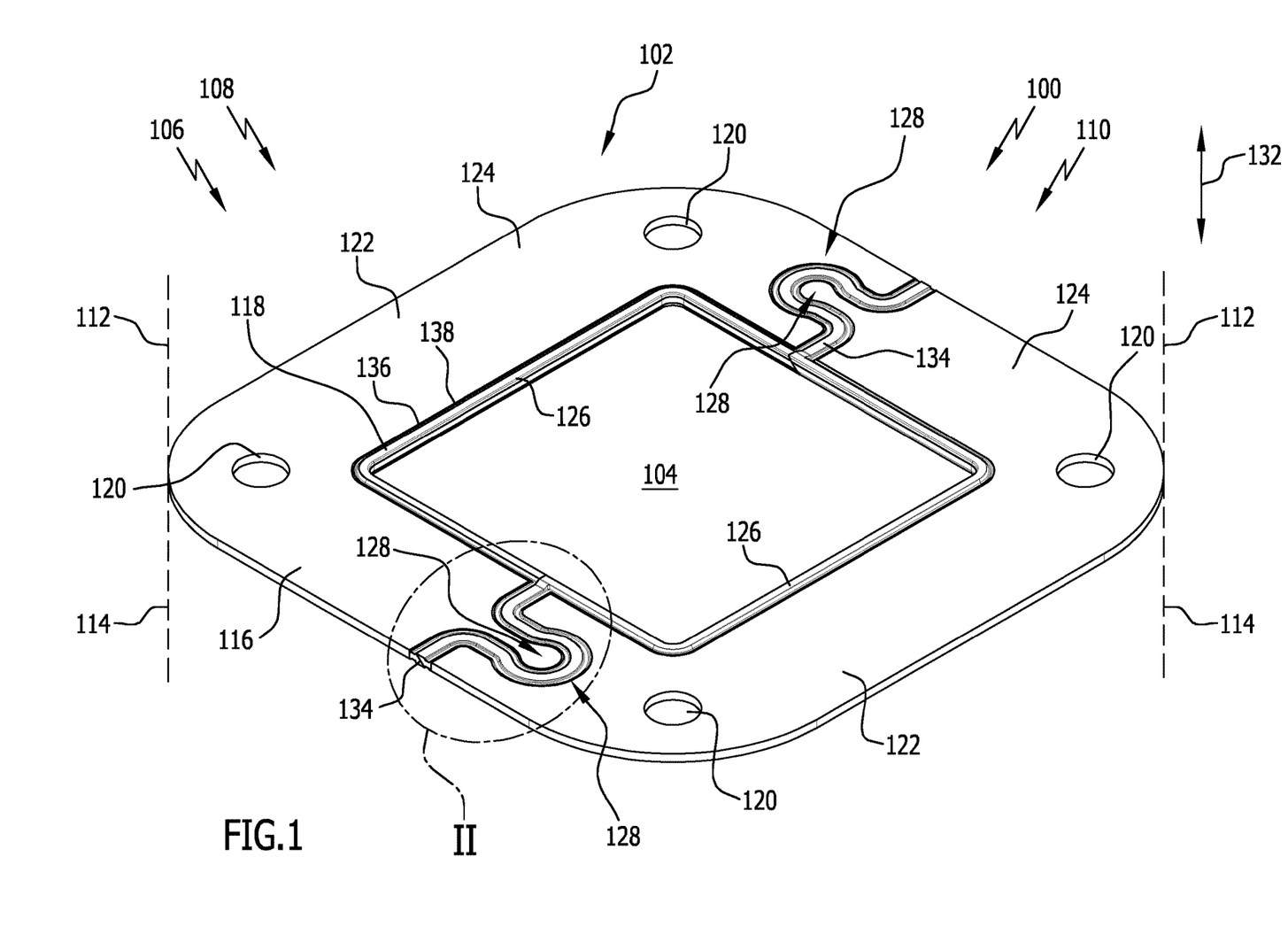
FIG. 1 shows a schematic perspective depiction of a seal arrangement comprising a sealing element.

FIG. 1 shows a seal arrangement designated as a whole by 100.

The seal arrangement 100 serves in particular to seal a first fluid space 102 from a second fluid space 104, for example in a battery or control box 106 of a motor vehicle 108, in particular of an electric motor vehicle.

The seal arrangement 100 comprises a sealing element 110 for arranging between a first object 112, for example a box lid of the battery or control box 106, and a second object 114, for example a box base part of the battery or control box 106.

The sealing element 110 comprises a preferably dimensionally-stable base body 116 and an elastic sealing body 118 arranged on the base body 116.

The sealing element 110 is thus in particular a so-called carrier gasket and/or a so-called metal elastomer gasket.

On the base body 116, the sealing element 110 comprises a total of four through-openings 120 through which in each case a connecting element, in particular a screw, can be inserted for connecting the first object 112 to the second object 114.

The sealing element 110 comprises two mutually connectible or, as shown in FIG. 1, mutually connected sealing element components 122.

The sealing element components 122 each comprise a base body part 124 and an elastic sealing body part 126 arranged on the base body part 124.

The base body parts 124 of the sealing element components 122 form the base body 116 and thus provide a load-bearing function of the sealing element 110.

The elastic sealing body parts 126 of the sealing element components 122 form the elastic sealing body 118 and thus provide a sealing function of the sealing element 110.

The base body parts 124 of the base body 116 each comprise in particular two connecting portions 128 for mutually connecting the base body parts 124 to each other.

Figure 4:
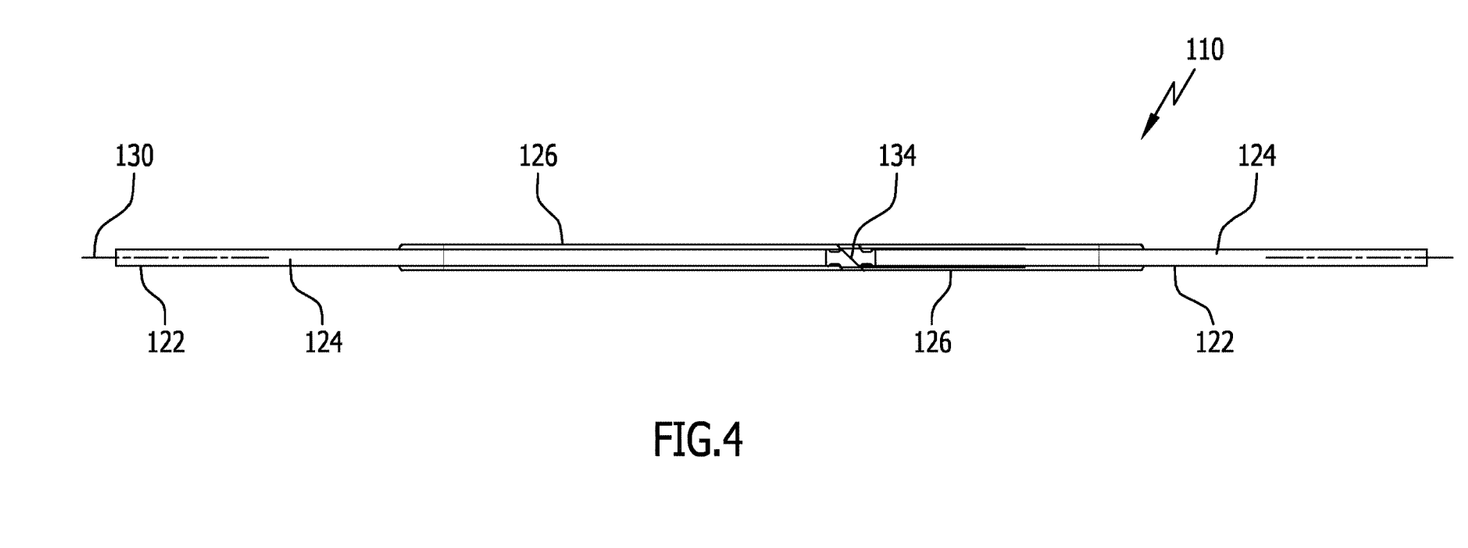
FIG. 4 shows a schematic side view of the sealing element from FIG. 3 with viewing direction in the direction of arrow 4 in FIG. 3.

The base body parts 124 are preferably connectible to each other, in particular connectible by means of plugging, in a direction perpendicular to a main plane of extent 130 of the sealing element 110 shown in FIG. 4, in particular in an assembly direction 132.

The elastic sealing body 118 and/or the elastic sealing body parts 126 preferably comprise an elastomer material 133 or are made of an elastomer material 133. The elastomer material 133 is in particular an ethylene acrylate rubber (AEM). Alternatively or in addition hereto, the elastomer material 133 is an ethylene propylene diene rubber (EPDM), an acrylate rubber (ACM), a fluororubber (FKM), a hydrogenated acrylonitrile butadiene rubber (HNBR) or a silicone rubber (MVQ), in particular a vinyl methyl polysiloxane.

The base body 116 and/or the base body parts 124 are made in particular of a metallic base body material 135 or comprise a metallic base body material 135. The metallic base body material 135 is in particular steel or aluminum.

Alternatively or in addition thereto, it is also conceivable for the base body 116 and/or the base body parts 124 to be made of a plastics material or comprise a plastics material.

The base body 116 and/or the base body parts 124 are preferably produced completely by means of punching and/or laser cutting from a metallic base body material 135, for example from a sheet metal material, in particular such that no further method steps need to be performed to produce the base body 116 and/or the base body parts 124.

The connecting portions 128 of the base body parts 124 are thereby preferably also produced by means of punching and/or laser cutting.

The elastic sealing body parts 126 of the elastic sealing body 118 are preferably injection molded onto a respective base body part 124 in an injection molding process. Upon injection molding the elastic sealing body parts 126 onto the base body parts 124, the elastic sealing body parts 126 are in particular not connected to each other.

In the injection molding process, in particular only the individual elastic sealing body parts 126 are injection molded onto the base body parts 124 and thus the sealing element components 122 are formed.

In the sealing element 110 shown in FIGS. 1 to 8, the sealing element components 122 are already connected to each other by means of the connecting portions 128.

The base body 116 of the sealing element 110 is thereby preferably of annular, in particular annularly closed, configuration.

Because the base body 116 and/or the base body parts 124 are made in particular of an at least approximately inflexible or stiff material, preferably of a metallic base body material 135, in particular the load-bearing function of the sealing element 110 can be provided by the base body 116.

As can be clearly seen in FIGS. 1 and 4 to 8, the sealing element 110 and/or the base body 116 are preferably of flat configuration.

The sealing element 110 and/or the base body 116 thereby extend in particular at least approximately along the main plane of extent 130 (cf. FIG. 4).

For producing the annularly closed shape of the base body 116 shown in the Figures, the sealing element components 122 are connected to each other in a puzzle-like, in particular positive-locking, manner.

The puzzle-like connection of the sealing element components 122 is effected in particular by the connecting portions 128 of the base body parts 124.

The sealing elements 122, which in particular are releasably connectible to each other, are preferably indirectly or directly connectible to each other, in particular at an abutment region 134 of the base body parts 124.

In the embodiments of the sealing element 110 shown in the Figures, the base body parts 124 are indirectly connected to each other by way of the elastic sealing body parts 126 arranged on the base body parts 124.

For this purpose, the elastic sealing body parts 126 are preferably injection molded onto not only one circumferential inner edge 136 of the base body 116.

Rather, the elastic sealing body parts 126 are also injection molded onto an edge 138 of the base body 116 or the base body parts 124 in the region of the connecting portions 128.

It is also conceivable, however, to connect the base body parts 124 in the abutment region 134 directly to each other and thus to provide the elastic sealing body parts 126 only on the inner edge 136 of the annularly closed base body 116.

As can be seen in the Figures, the base body parts 124 are connectible to each other, preferably in a puzzle-like, in particular positive-locking manner, by means of the connecting portions 128.

The connecting portions 128 are in particular configured complementarily in such a way that the connecting portions 128 and/or the elastic sealing body parts 126 arranged thereon interengage each other in a positive-locking manner when the base body parts 124 are connected to each other in the assembly direction 132.

For mutually connecting the base body parts 124, the connecting portions 128 in particular each have two undercut portions 140.

Figure 3:
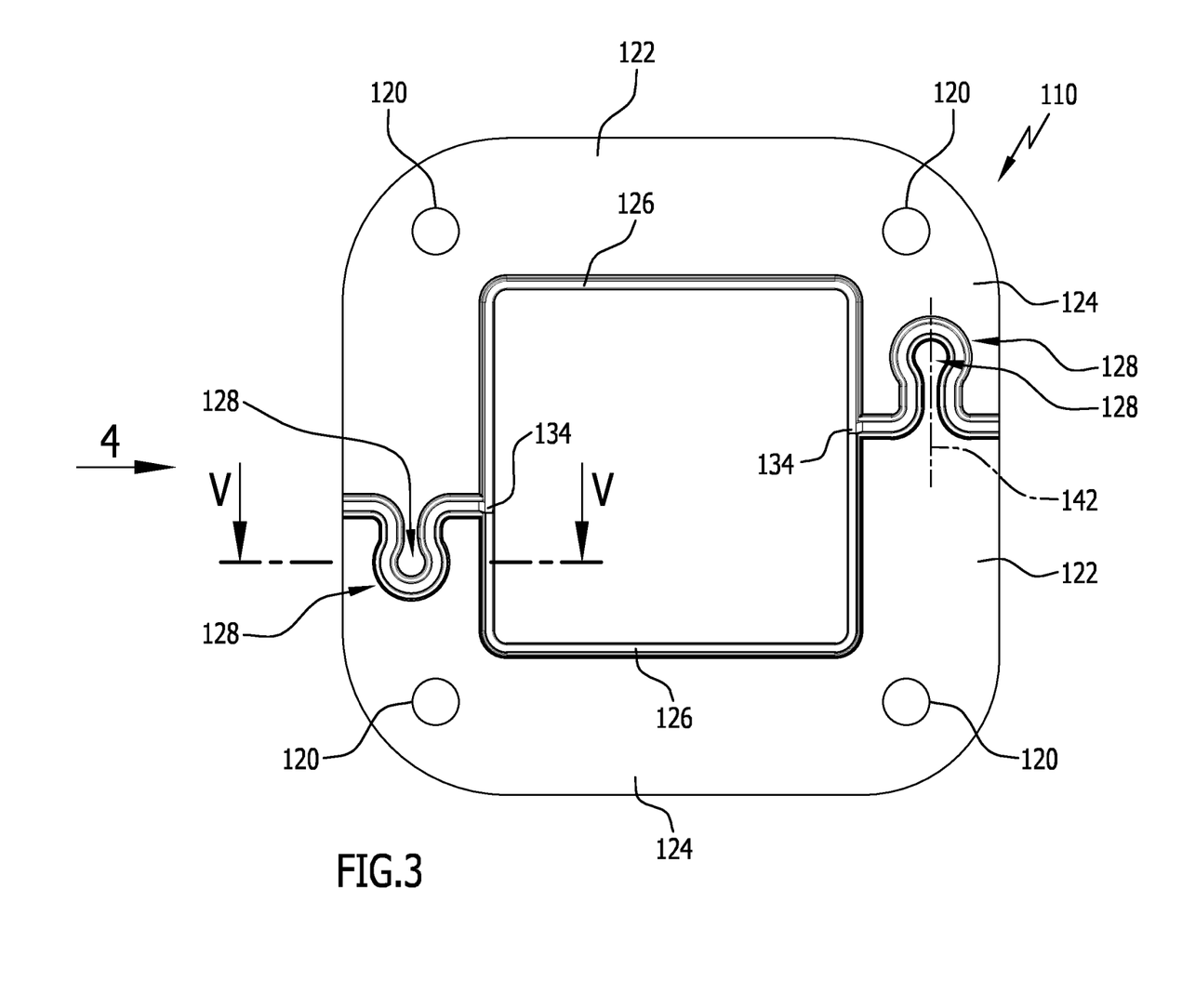
FIG. 3 shows a schematic plan view from above of the sealing element from FIG. 1.

As can be seen clearly in FIG. 3, the connecting portions 128 are preferably formed symmetrically to a symmetry plane 142.

The undercut portions 140 are in particular arranged and configured in such a way that mutually connected base body parts 124 in the region of the connecting portions 128 are coupled, in particular connected in a positive-locking manner, in a direction parallel to the main plane of extent 130 of the sealing element 110.

For this purpose, the undercut portions 140 undercut each other in a direction running parallel to the symmetry plane 142.

Mutually connected base body parts 124 are therefore, in particular, anchored in a positive-locking manner in the region of the connecting portions 128 in a direction parallel to the main plane of extent 130 of the sealing element 110.

The connecting portions 128 preferably each comprise a connecting portion geometry 144.

Figure 2:
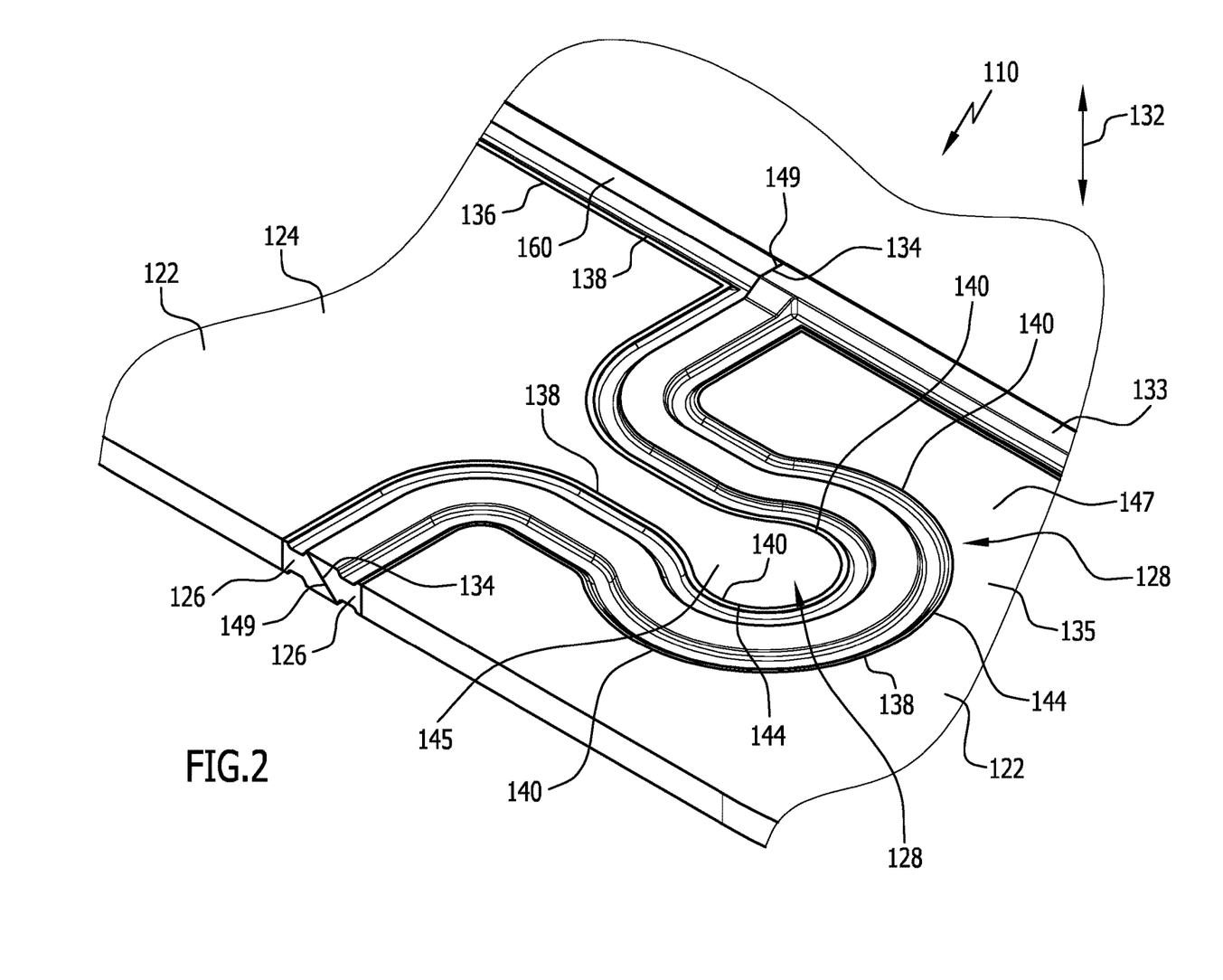
FIG. 2 shows an enlarged depiction of region II in FIG. 1.

Two connecting portions 128 are in particular each formed complementarily to each other in such a way that each connecting portion 128 comprises a positive form 145 of the connecting portion geometry 144, wherein each connecting portion 128 comprises a negative form 147 of the connecting portion geometry 144 (cf. FIG. 2).

In the embodiments of the sealing element 110 shown in the Figures, the connecting portion geometry 144 is in particular configured in a puzzle-like manner.

Alternatively thereto, it is conceivable for the connecting portion geometry 144, i.e. the positive form 145 and/or the negative form 147, to have, in particular, a dovetail geometry.

To be able to simplify an assembly of the sealing element 110, provision is made in particular for in each case only two connecting portions 128 to correspond with each other, i.e.

in each case only two connecting portions 128 comprise a mutually complementary connecting portion geometry 144.

In particular, for sealing element components 122 to be connected and/or base body parts 124 to be connected, only one respective connecting portion geometry 144 is provided, i.e. positive form 145 and negative form 147 of the connecting portions 128 are formed complementarily to each other. Sealing element components 122 and/or base body parts 124 can thus in particular not be connected to each other incorrectly.

As is clear in the Figures, the elastic sealing body parts 126 are preferably interrupted in the abutment region 134 and form there an abutting joint 149 (cf. FIG. 2).

The elastic sealing body parts 126 therefore each extend in particular along an edge 138 of a respective base body part 124.

As mentioned above, in the embodiment of the sealing element 110 shown in the Figures, the elastic sealing body parts 126 extend along the inner edge 136 and along an edge 138 of the connecting portions 128 of the base body parts 124.

In particular, the elastic sealing body parts thereby extend in the region of the connecting portions 128 of the connecting portion geometry 144.

In the embodiments of the sealing element 110 depicted in the Figures, the elastic sealing body parts 126 are arranged both on the positive form 145 and on the negative form 147 of the connecting portion geometry 144 of the connecting portions 128, i.e. a respective elastic sealing body part 126 is arranged both on the positive form 145 and on the negative form 147.

Alternatively, it is conceivable for an elastic sealing body part 126 to be arranged only on the positive form 145 or only on the negative form 147 of the connecting portion geometry 144 of the connecting portions 128.

If a respective elastic sealing body part 126 is arranged in the abutment region 134 of the base body parts 124 on both base body parts 124, the elastic sealing body parts 126 in particular each comprise a coupling portion 146 for coupling mutually abutting or mutually overlapping elastic sealing body parts 126.

Figure 5:
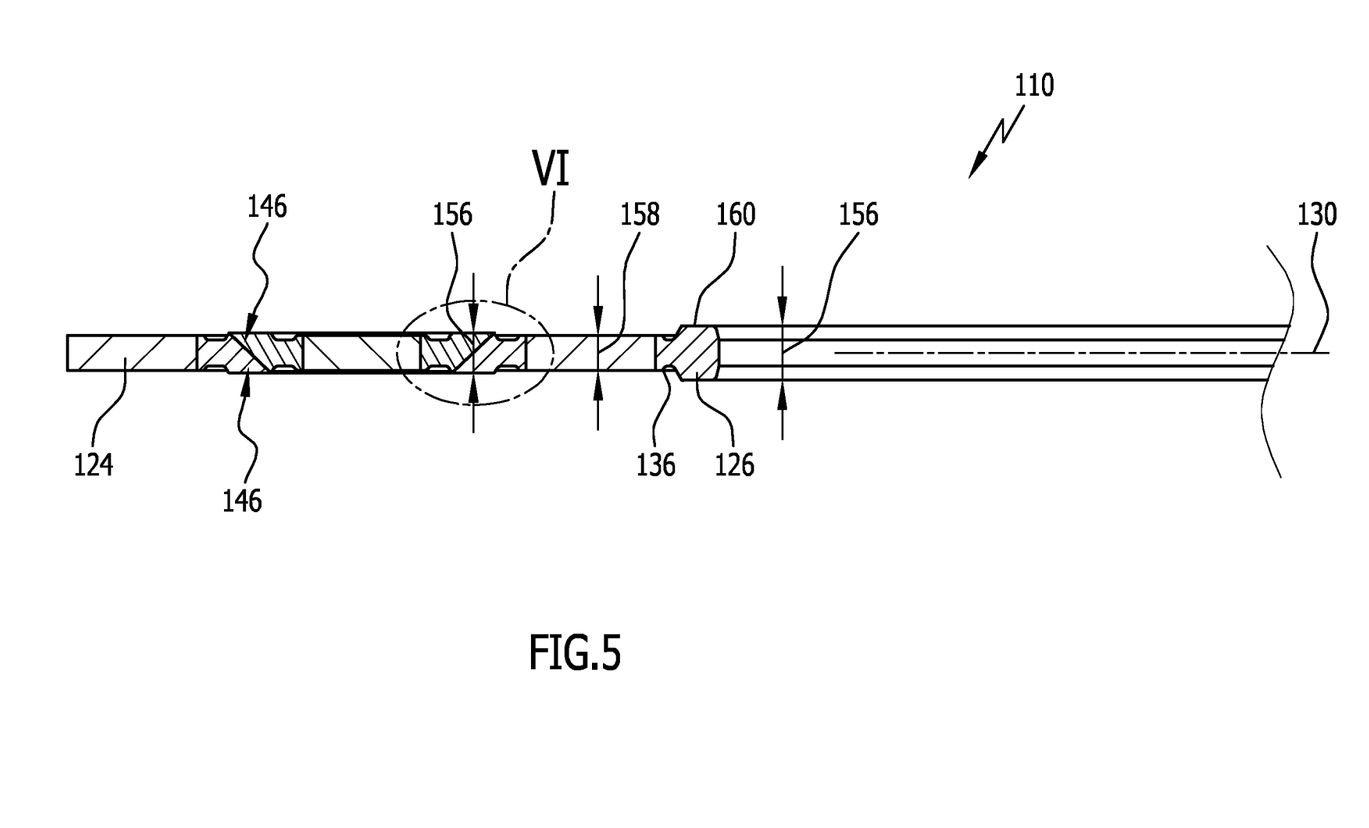
FIG. 5 shows a schematic section of the elastic sealing element from FIG. 3 along the line V-V in FIG. 3.
Figure 6:
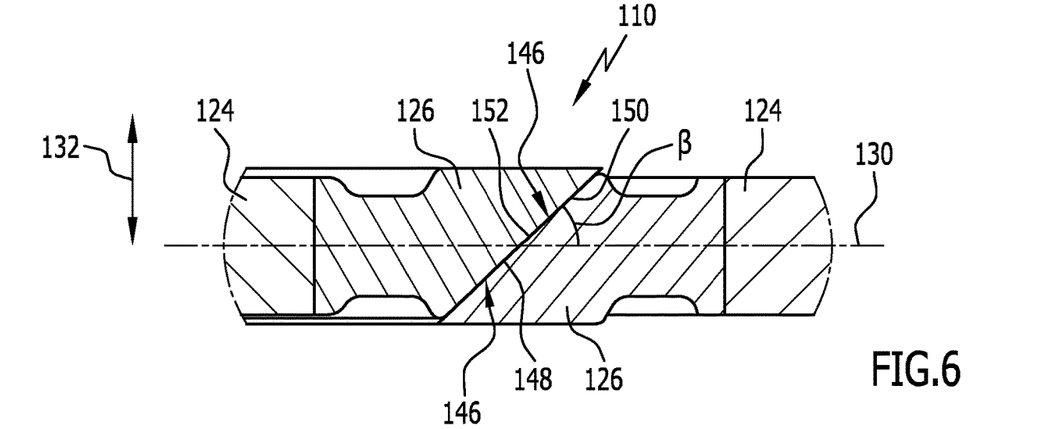
FIG. 6 shows an enlarged depiction of region VI from FIG. 5 with a first embodiment of a coupling portion.
Figure 7:
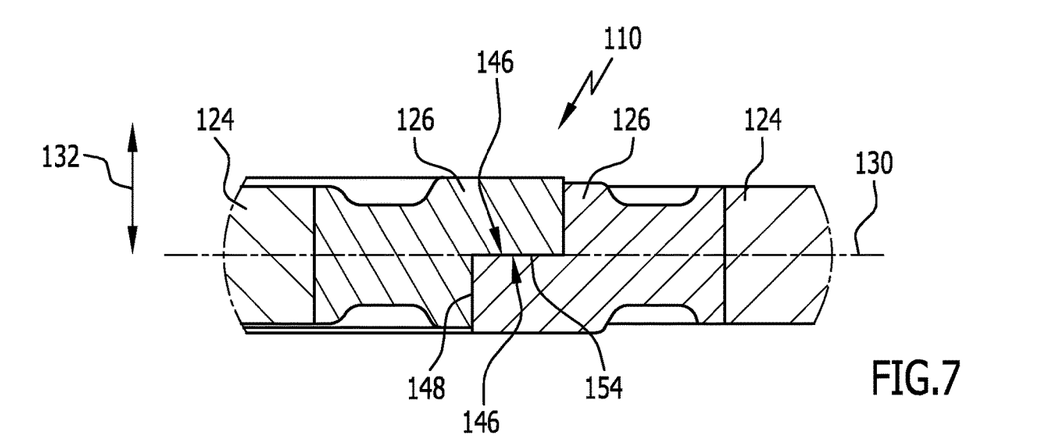
FIG. 7 shows a depiction, corresponding to FIG. 6, of a second embodiment of the coupling portion.
Figure 8:
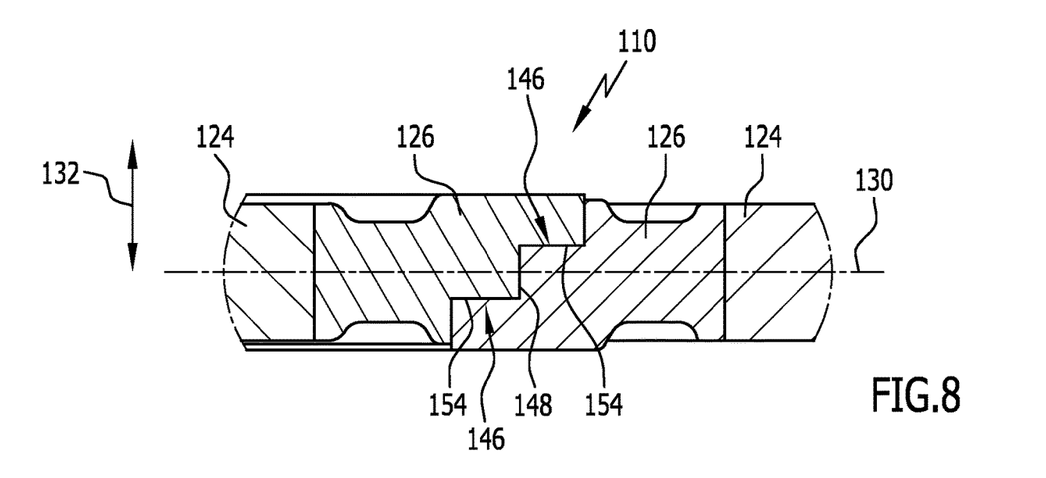
FIG. 8 shows a depiction, corresponding to FIG. 6, of a third embodiment of the coupling portion.

Coupling portions 146 of that kind can be seen clearly in particular in FIG. 5 and in the alternative detail views in FIGS. 6 to 8.

The coupling portions 146 are configured in particular in such a way that the elastic sealing body parts 126 sealingly abut each other in the region of the coupling portions 146 when the sealing element components 122 and/or the base body parts 124 are connected to each other, in particular when the sealing element 110 is arranged between the first object 112 and the second object 114.

The coupling portions 146 each comprise a coupling geometry 148.

As can be seen clearly in FIGS. 6 to 8, each two elastic sealing body parts 126 have a mutually complementary coupling geometry 148.

The coupling geometry 148 of the coupling portions 146 in particular has no undercuts in the assembly direction 132 of the sealing element components 122 and/or of the base body parts 124.

The elastic sealing body parts 126 are preferably configured to sealingly abut against each other upon assembly or connection of the base body parts 124 in a direction perpendicular or oblique, i.e. transverse, to the main plane of extent 130 of the sealing element 110.

The base body parts 124 are in particular connectible to the elastic sealing body parts 126 arranged thereon by means of the connecting portions 128 in the assembly direction 132, without a connection of the base body parts 124 being hindered by undercuts in the coupling geometry 148.

In the embodiment of the sealing element 110 shown in FIGS. 1 to 6, the coupling geometry 148 is configured e.g. as a chamfer 150 or as an inclined face 152. The chamfer 150 or inclined face 152 is arranged in particular at an angle β in the range of about 40° to about 70° in relation to the main plane of extent 130 of the sealing element 110.

In the embodiments of the sealing element 110 shown in FIGS. 7 and 8, the coupling geometry 148 is of a stepped configuration and has one step 154 (cf. FIG. 7) or two or more steps 154 (cf. FIG. 8). However, it is also conceivable for the coupling geometry 148 to be of corrugated configuration.

If an elastic sealing body part 126 is provided on only one respective base body part 124 in the abutment region 134, preferably no coupling geometry 148 is necessary.

As can be clearly seen in FIG. 5, the elastic sealing body 118 has a sealing body height 156 in a direction perpendicular to the main plane of extent 130 of the sealing element 110.

The base body 116 has a base body height 158 in a direction perpendicular to the main plane of extent 130 of the sealing element 110.

The sealing body height 156 is preferably greater than the base body height 158, in particular about 15% to about 40% greater, preferably about 25% greater.

The base body 116 preferably has a base body height 158 in the range of about 1 to about 3 mm, in particular in the range of about 1.5 to about 2 mm.

It can thus be achieved in particular that the elastic sealing body 118 is compressed at least in regions when the sealing element 110 is arranged between two objects 112, 114.

In the region of a sealing lip 160 arranged on the inner edge 136 of the base body 116, the elastic sealing body 118 has a sealing body height 156 which is greater than a sealing body height 156 in the region of the connecting portions 128 and/or the coupling portions 146 (cf. FIG. 5).

As can be clearly seen in FIGS. 1 to 3, the sealing element components 122 are of nearly identical configuration.

In the embodiment shown in the Figures, the sealing element 110 comprises two identical base body parts 124.

The elastic sealing body parts 126 of the sealing element 110 are configured nearly identically, but differently in the abutment region 134, in particular in the region of the coupling portions 146.

A respective elastic sealing body part 126 is associated with each base body part 124, such that the number of elastic sealing body parts 126 in particular corresponds to a number of base body parts 124.

Overall, a seal arrangement 100 with a sealing element 110 that can be produced in a simple and cost-effective manner can be provided, which enables a simple and reliable sealing of a first fluid space from a second fluid space.

The invention claimed is:

1. A seal arrangement, in particular for sealing a first fluid space from a second fluid space or a plurality of fluid spaces, comprising a sealing element for arranging between a first object and a second object, wherein the sealing element comprises two or more mutually connectible or mutually connected sealing element components which each comprise a base body part and an elastic sealing body part arranged on the base body part, wherein the base body parts of the sealing element components form a preferably dimensionally-stable base body of the sealing element, wherein the elastic sealing body parts of the sealing element components form an elastic sealing body for providing a sealing function of the sealing element, wherein the elastic sealing body parts each extend along an edge of an abutment region of the base body parts, wherein the sealing element components are connectible to each other, at the abutment region of the base body parts, by indirect anchor connection of the base body parts, wherein the base body parts each comprise one or more connecting portions for connecting the base body parts to each other by the indirect anchor connection of the base body parts, wherein the connecting portions have one or more undercut portions of the base body parts and at least one of the elastic sealing body parts extends along the edge of the abutment region at the one or more undercut portions, and wherein the indirect anchor connection of the base body parts is an anchor connection of the base body parts by means of the at least one elastic sealing body parts extending along the edge of the one or more undercut portions.

2. The seal arrangement in accordance with claim 1, wherein the sealing element components are connectible to each other in a puzzle-like manner, in particular in a positive-locking manner, in particular for producing one or more annularly closed shapes of the base body.

3. The seal arrangement in accordance with claim 1, wherein the sealing element comprises a plurality of identical sealing element components and/or a plurality of identical base body parts and/or a plurality of identical elastic sealing body parts.

4. The seal arrangement in accordance with claim 1, wherein the base body parts each comprise two connecting portions for connecting the base body parts to each other.

5. The seal arrangement in accordance with claim 1, wherein the base body parts are connectible to each other, in particular connectible by plugging, in a direction perpendicular to a main plane of extent of the sealing element.

6. The seal arrangement in accordance with claim 1, wherein the elastic sealing body parts each comprise a coupling portion for coupling mutually abutting or mutually overlapping elastic sealing body parts.

7. The seal arrangement in accordance with claim 1, wherein the elastic sealing body is arranged on an edge of the base body.

8. The seal arrangement in accordance with claim 1, wherein the elastic sealing body has a sealing body height in a direction perpendicular to a main plane of extent of the sealing element, wherein the base body has a base body height in a direction perpendicular to the main plane of extent of the sealing element, wherein the sealing body height is greater than the base body height.

9. The seal arrangement in accordance with claim 1, wherein the elastic sealing body comprises an elastomer material or is made of an elastomer material, wherein the elastomer material preferably is an ethylene acrylate rubber (AEM), an ethylene propylene diene rubber (EPDM), an acrylate rubber (ACM), a fluororubber (FKM), a hydrogenated acrylonitrile butadiene rubber (HNBR), or a silicone rubber (MVQ), in particular a vinyl methyl polysiloxane, and/or in that the base body is made of a metallic base body material or comprises a metallic base body material, wherein the metallic base body material in particular is steel or aluminum.

10. The seal arrangement in accordance with claim 1, wherein the base body and/or the base body parts are produced by means of punching and/or by means of laser cutting and/or by means of water jet cutting and/or by means of manual cutting.

11. A battery or control box, in particular for a motor vehicle, comprising the seal arrangement in accordance with claim 1.

12. A motor vehicle, comprising at least said seal arrangement, and further comprising the battery or control box in accordance with claim 11.

13. A method for producing a seal arrangement in accordance with claim 1 for sealing a first fluid space from a second fluid space or a plurality of fluid spaces, wherein the method comprises the following:
providing a plurality of sealing element components which each comprise a base body part and an elastic sealing body part arranged on the base body part;
connecting the sealing element components to each other in a puzzle-like manner.

14. The method in accordance with claim 13, wherein the sealing element components are produced as mutually separate components, wherein in each case an elastic sealing body part is injection molded onto a respective base body part in an injection molding process.

15. The seal arrangement in accordance with claim 1, wherein
the sealing element components are connectible to each other, at the abutment region of the base body parts, by the indirect connection of the base body parts, and
the indirect connection of the base body parts is the connection of the base body parts by means of the elastic sealing body parts, which indirect connection is such that the base body parts of the connectible sealing element components do not come into direct contact with each other.

* * * * *